United States Patent [19]

Thiel et al.

[11] Patent Number: 5,309,329
[45] Date of Patent: May 3, 1994

[54] FLASH DEVICE FOR DYE TRANSFERRING

[75] Inventors: Reinhold Thiel, Leutenbach-Weiler; Ulrich Staiger, Stuttgart; Olaf Kosanke, Darmstadt; Volker Gericke, Waiblingen, all of Fed. Rep. of Germany

[73] Assignee: Eastman Kodak Company, Rochester, N.Y.

[21] Appl. No.: 942,541

[22] Filed: Sep. 9, 1992

[30] Foreign Application Priority Data

Sep. 18, 1991 [DE] Fed. Rep. of Germany ....... 4130992

[51] Int. Cl.$^5$ .............................................. G03B 15/02
[52] U.S. Cl. ............................................. 362/17; 362/223; 362/286; 362/289; 362/290; 362/307; 362/354; 362/343; 430/7; 359/885
[58] Field of Search .................. 362/16, 17, 18, 222, 362/223, 224, 290, 307, 354, 342, 343, 286, 289; 430/7, 321; 359/885

[56] References Cited

U.S. PATENT DOCUMENTS

| | | | |
|---|---|---|---|
| 3,811,751 | 5/1974 | Myer | 359/49 |
| 4,415,955 | 11/1983 | Griffing et al. | 362/290 X |
| 4,716,436 | 12/1987 | Lang | 355/218 |
| 4,932,768 | 6/1990 | Gobell | 359/849 |
| 5,229,232 | 7/1993 | Longobardi et al. | 430/7 |

FOREIGN PATENT DOCUMENTS

| | | |
|---|---|---|
| 0101014 | 11/1985 | European Pat. Off. . |
| 2347287 | 4/1975 | Fed. Rep. of Germany . |
| 2511423 | 9/1976 | Fed. Rep. of Germany . |
| 62-103183 | 5/1987 | Japan . |
| 636714 | 6/1983 | Switzerland . |

Primary Examiner—Stephen F. Husar
Attorney, Agent, or Firm—Milton S. Sales

[57] ABSTRACT

The invention relates to a flash device, preferably for transferring a dye matrix which by means of a high-energy light flash is transferred from a radiation-absorbing carrier film by interleaving a mask onto a receiver element. This requires substantially perpendicular irradiation of the transfer plane with a high-energy radiation and a high uniformity of irradiance distribution of the light flash. To achieve this, one or two linearly extending plasma discharge tubes are provided which to concentrate radiation are enclosed by two separate aspheric-cylindrical reflectors, the concentrated radiation being directed through a lamellar louver element arranged downstream of the reflector and impinging on the predetermined transfer plane in a substantially parallel and perpendicular manner.

10 Claims, 4 Drawing Sheets

FLASH DEVICE FOR DYE TRANSFERRING

CROSS-REFERENCE TO RELATED APPLICATION

Reference is made to commonly assigned U.S. patent application Ser. No. 740,231 filed Aug. 5, 1991 in the names of Longobardi et al. and entitled "Method of Making Thermally-Transferred Color Filter Array With Incorporated Black Matrix Using Electronic Light Flash," now U.S. Pat. No. 5,229,232, the disclosure of which is incorporated by reference.

FIELD OF THE INVENTION

The invention relates to a flash device for emitting a high-energy light flash, preferably for transferring dye particles from a radiation-absorbing carrier film which is provided with a sublimable dye layer through a mask onto a receiver element, e.g. a glass plate or the like.

BACKGROUND OF THE INVENTION

A prerequisite for a obtaining a high quality of such color patterns, e.g. when producing color video display screens, is a high uniformity of pixel density across the entire receiver plate. Apart from this macro-uniformity behavior, uniformity of optical density of the individual pixel elements and their crisp pixel edges are important parameters to increase the resolution of the color patterns produced. Uniformity and edge crispness of the transferred pixels is reached by substantially homogeneous light distribution and the impingement of parallel radiation, perpendicular through a mask, onto the receiver element, that is to say by uniform distribution of irradiance and perpendicular light incidence.

From DE-OS 23 47 287 and EP-PS 0 101 014 electronic flash devices are known whose reflectors are designed such that a variation of the light emitting angle and a uniform illumination of the receiver surface are possible.

CH-PS 636 714 discloses an electrostatic copier having a flash lamp whose reflector distributes the radiation of the lamp as uniform as possible onto a surface to be fused, thereby heating toner powder to melt.

A copier described in DE-OS 25 11 423 discloses a quartz iodine lamp which is arranged in one of the focal axes of an elliptic cylinder-shaped reflector. The opposite focal axis of the reflector is to coincide as exactly as possible with the surface of an image carrier and the toner layer coated thereon so that the toner layer is fused due to the radiant energy absorbed.

A disadvantage of the above mentioned arrangements is that neither a parallel nor a perpendicular light incidence onto the predetermined receiver at a transfer plane is obtained. Moreover, no high-energy light flash having a high radiant output can be produced on a relatively large receiver surface corresponding, for example, to a medium-sized video display screen.

SUMMARY OF THE INVENTION

It is the object of the present invention to provide a flash device of the initially mentioned type, preferably for transferring a dye, permitting substantially perpendicular irradiation of a predetermined transfer plane with high irradiance and a high uniformity of irradiance distribution.

According to the invention, the above object is attained in a flash device for directing high-energy light flash, to a dye transfer plane, such device being usable for dye transfer such as by transferring dye particles from a radiation-absorbing carrier film which is provided with a sublimable dye layer through a mask onto a receiver element, e.g. glass plate or the like, comprising at least one linearly extending plasma discharge tube means defining an aspheric-cylindrical reflector which concentrates radiation from the tube; and a lamellar louver element arranged downstream of the reflector and which directs concentrated radiation from the reflector to impinge on the predetermined dye transfer plane in a substantially perpendicular manner.

The above arrangement is particularly advantageous in that a cost-effective and quick manufacture of the individual reflectors having complex curves of intersection is possible and a large surface of the transfer plane as, for example, required for the manufacture of a dye matrix for a display surface of medium-sized video monitors is illuminated according to the object of the present application.

In another advantageous embodiment of the invention the curvatures of the two reflector areas are formed in accordance with a curve of intersection which directs the light emitted by the plasma discharge tubes substantially perpendicular onto a lamellar louver element formed by a film absorbing light in response to the incidence angle, the film including parallel microlouvers arranged perpendicular and at right angles to the longitudinal axes of the plasma discharge tubes and perpendicular to the transfer plane. As a result, the film acting as a louver element absorbs only the amount of light which is not perpendicularly directed thereon.

Due to the particular curvatures of the reflectors and the covering of the reflector openings by the louver element consisting of a light-absorbing film, a uniformity of irradiance in the transfer plane of more than 90% can be reached.

Surprisingly, the above object can also be obtained in that a steel band is used as a louver element. This embodiment of the invention has the advantage that the flash frequency of the plasma discharge tubes can be increased because a steel band shows better heat dissipation properties.

For further improving the uniformity of the irradiance in the predetermined transfer plane and for obtaining an almost perpendicular irradiation of the transfer plane, the plasma discharge tubes can be adjusted horizontally and vertically by means of micrometric screws located at right angles on the lateral exterior walls. Advantageously, the micrometric screws may also be actuated by stepper motors controlled by a microcomputer. Thus, a maximum of uniformity of irradiance in the transfer plane is guaranteed.

Further advantageous developments of the invention are characterized by the features disclosed in the subclaims.

A preferred embodiment of the invention will be explained in detail with reference to the drawing.

DETAILED DESCRIPTION OF THE PREFERRED EMBODIMENT

Figure 1:
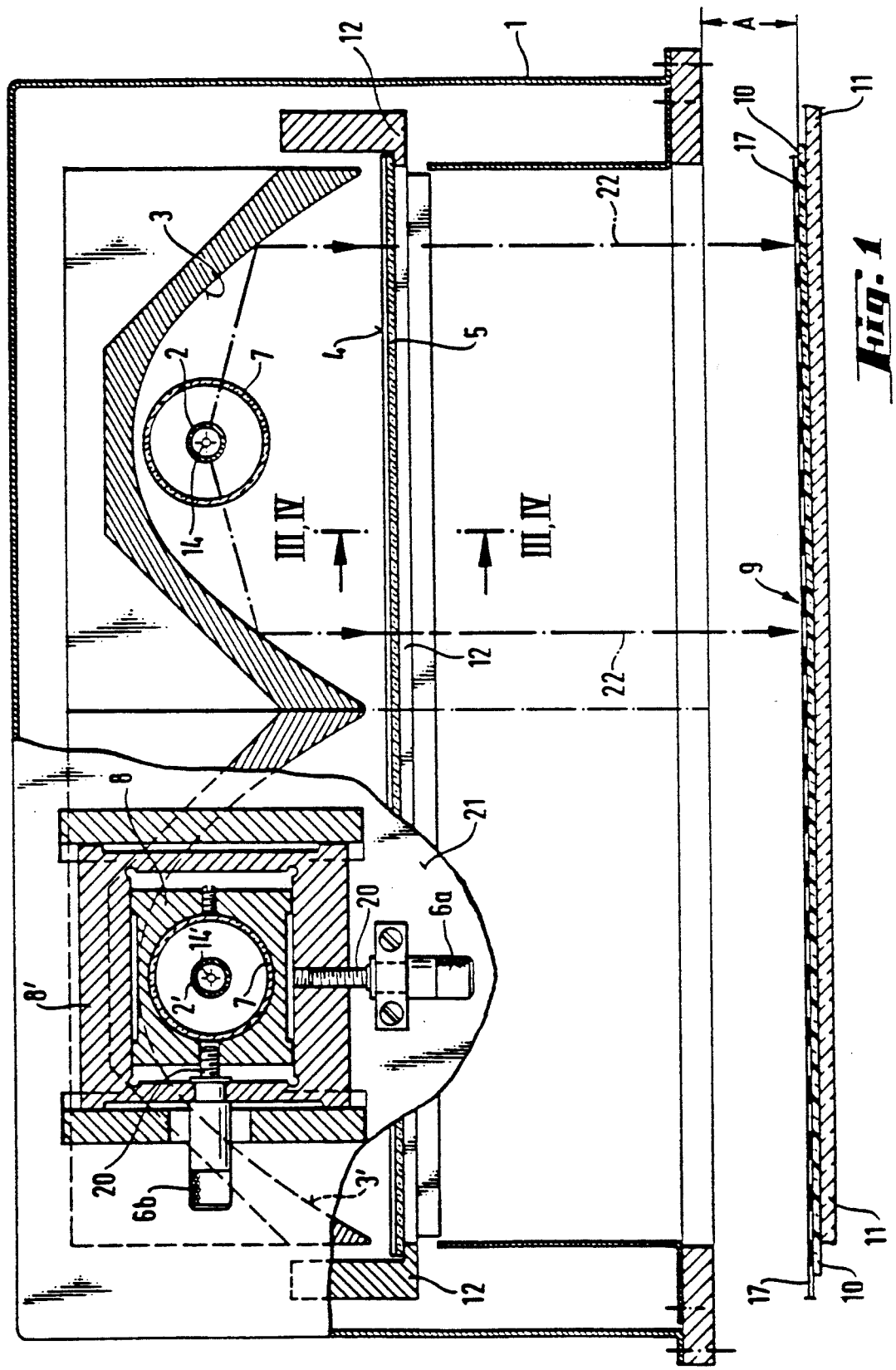
FIG. 1 shows a cross-section of the flash device.
Figure 2:
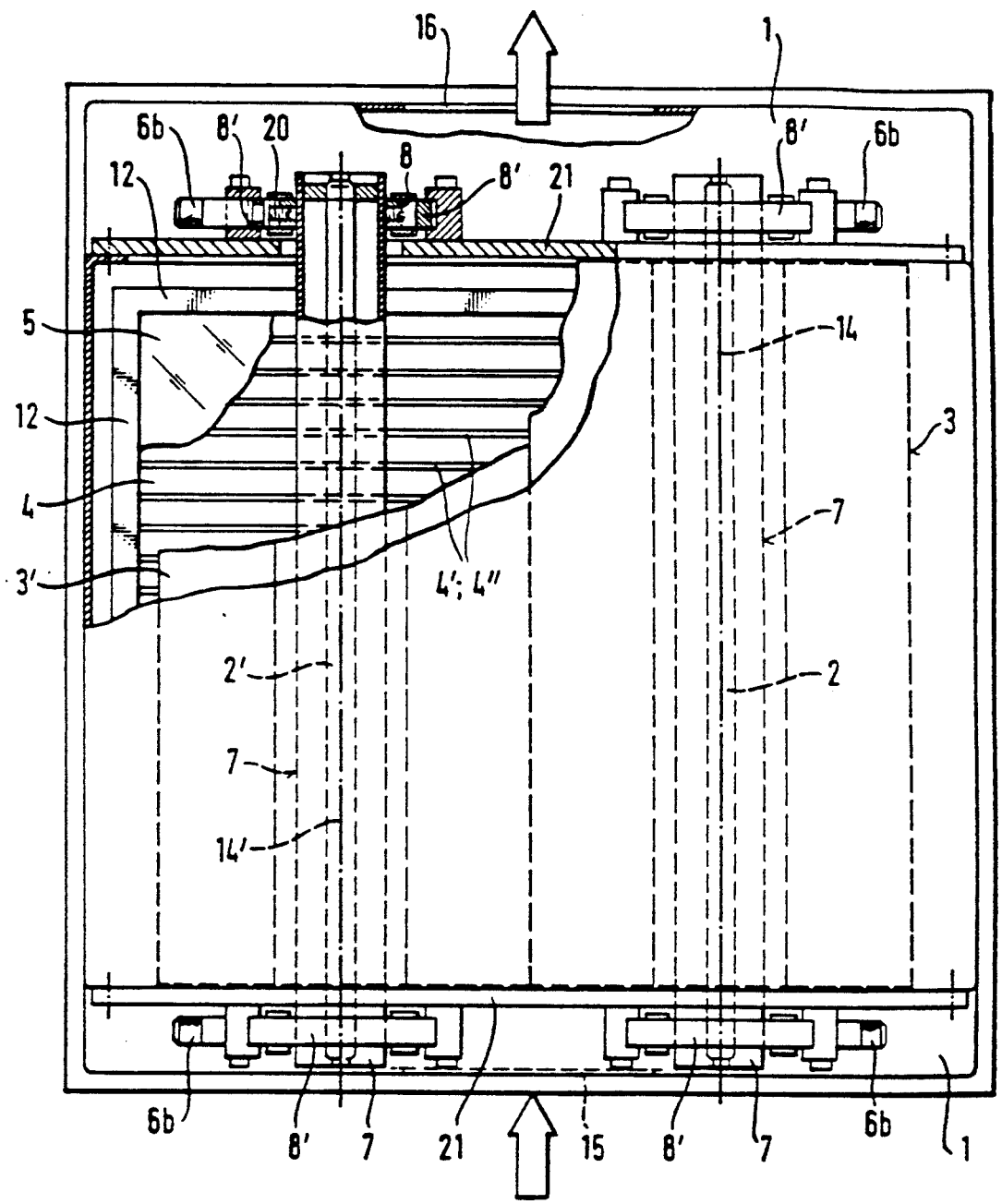
FIG. 2 shows a top view of the flash device according to FIG. 1.

A housing 1 encloses a flash device which includes aspheric-cylindrical reflectors 3, 3', each reflector being formed by an aluminum alloy. For each reflector, a rod-shaped discharge tube is placed parallel to the surface lines of its reflector. Each tube has, for example, a tube diameter of 8 mm. A shell 7 slid over the plasma discharge tube is enclosed by a frame 8 which is located at the lateral exterior walls of the reflectors 3, 3' and which, in turn, is surrounded by an additional frame 8'. Threads 20 of a micrometric screw 6a, 6b engage with one side each of the frames 8 and 8', the screw being arranged on each of the two lateral exterior walls 21 for each of the plasma discharge tubes 2, 2'.

Adjustment and checking of the correct alignment of the plasma discharge tubes 2, 2' in a dye reflectors 3, 3' is effected by means of a CCD camera (not illustrated) which is aligned with respect to the transfer plane 9 and by means of which the intensity of illumination in the transfer plane 9 is converted into an electrical signal and fed to a microcomputer. The microcomputer compares between a stored illumination value and the measured value and defines a signal used, for example, for microcomputer-controlled adjustment of the micrometric screws 6a, 6b driven by stepper motors. In a simplified form, as shown in FIG. 1, the micrometric screws 6a, 6b are adjusted manually.

A metal frame 12 covering the two reflectors 3, 3' carries a lamellar louver element 4 which in a first embodiment of the invention includes a radiation-absorbing polymer film in which radiation-absorbing sections acting in the same manner as the microlouvers 4' are incorporated. The microlouvers 4' are arranged parallel to each other as well as perpendicular and at right angles with respect to the longitudinal axes 14, 14' of the plasma discharge tubes 2, 2' and normal to the transfer plane 9. Laterally impinging light, for example, is effectively reduced by the film 4 in that the light is absorbed within the blackened areal film sections (microlouvers), that is to say, the greater the light incidence angle deviates from an angle of 90° the greater is the absorption. To remove the heat produced thereby air is blown through the air vents 15 and 16 provided in housing 1 which then escapes through the ventilating ducts arranged on the rear sides of the reflectors 3, 3'.

Figure 3:
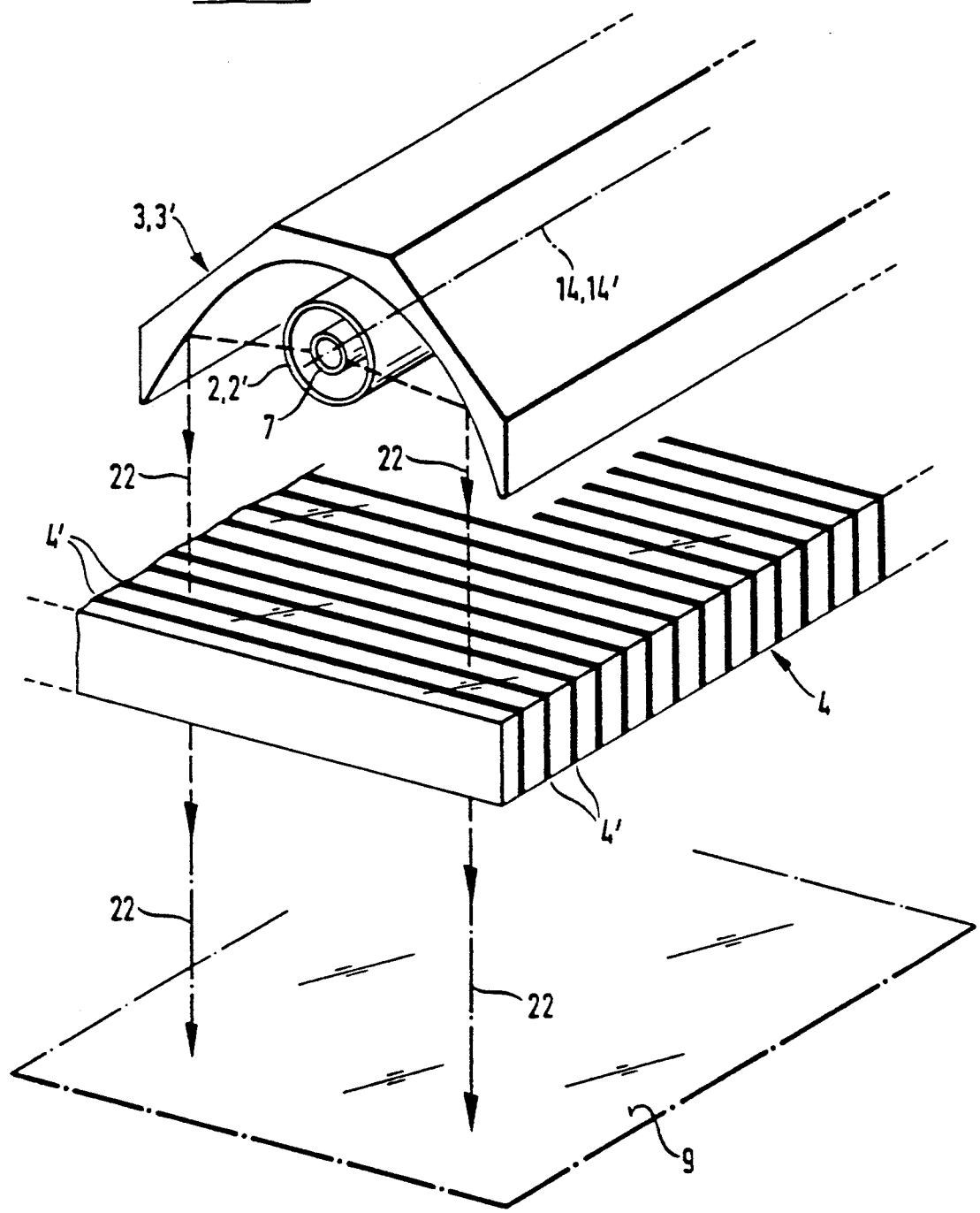
FIG. 3 shows an axonometric representation of a louver element.

The uniform illumination of the given dye transfer plane 9 by means of perpendicular light incidence 22 and high irradiation intensity requires a number of microlouvers 4' (FIG. 3) in the radiation-absorbing polymer film which depends on the size of the transfer plane. When optimized, a spacing between the individual microlouvers of 0.1 to 0.3 mm will result for a 150×300 mm sized transfer surface at a film thickness of 0.75 mm.

Each of the reflectors 3, 3' are covered by a highly shock-proof and highly transparent Synsil quartz plate 5 so as to prevent the emission of particles into the clean room required for performing the method if the plasma tube explodes.

Figure 4:
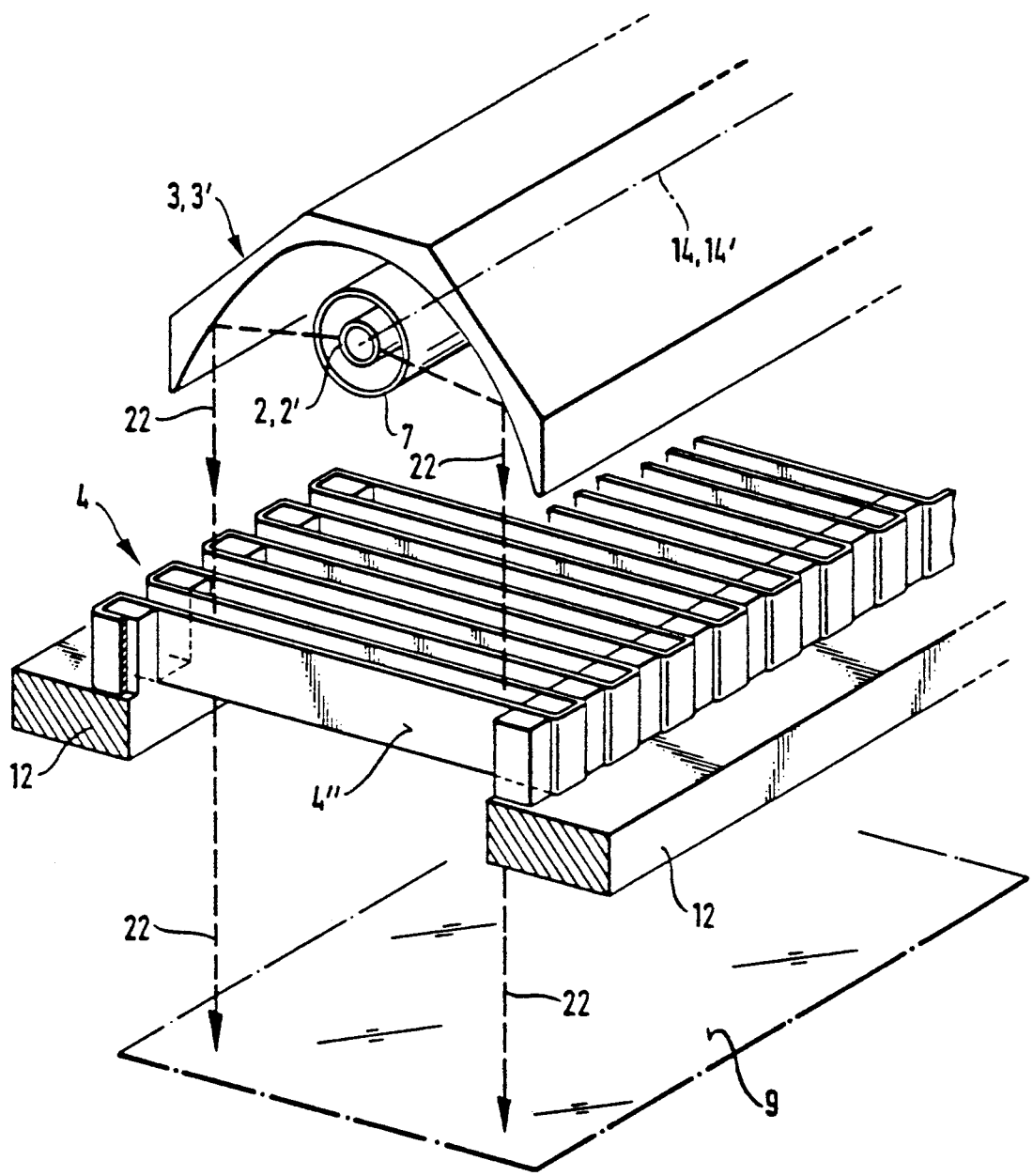
FIG. 4 shows a schematic view of a different louver element.

In a further embodiment of the invention (FIG. 4) the louver element 4 consists of a steel band 4" which is held under tension in a meander-like shape in a frame 12 such that it takes a position perpendicular and at right angles to the longitudinal axes 14, 14' of the plasma discharge tubes 2, 2'. The individual sections thereof thus formed extend parallel to one another.

The illumination of the given transfer plane 9 which requires perpendicular light incidence and a high irradiance level necessitates with regard to the size of the transfer plane already described 75 to 80 sections at a thickness of the steel band of 0.05 mm and a height of 6 mm. The tensile load is 25 newton per section.

At a distance "A" from the reflector housing 1 a mask 17 is located at the transfer plane 9.

Beneath the mask a radiation-absorbing carrier film 10 provided with the sublimable dye layer is arranged and a receiver element 11 is positioned underneath the carrier film.

Ignition of the plasma discharge tubes is effected by means of a power supply which is not described in detail and delivers an approximately rectangular 5 kilojoule pulse with a duration $t < 1.0$ ms. The light emitted by the tubes 2, 2' is reflected substantially parallel to or with a maximum deviation from the normal to the reflecting surface of less than 10° onto the polyester film, acting as a louver element 4 and including microlouvers 4' or a steel band 4", by the smooth reflective surfaces of the reflectors 3, 3' having a curve of intersection which is defined according to the function $$x = \frac{Y^2}{R\left(1 + \sqrt{1 - (A_k + 1)\frac{Y^2}{R^2}}\right)} + DY^2 + EY^6 + FY^8$$

wherein
R—47,96 mm
$A_k$—1,198
D—0,62×10$_{-7}$
E—2,92×10$_{-11}$
F—1,2×10$_{-15}$, In this way, overheating of the polyester film or the reflectors due to radiation absorption is prevented and a parallel and perpendicular light incidence onto the transfer plane 9 achieved, the uniformity of the illumination intensity being raised to more than 90%.

The light flash impinging on the mask 17 located in the transfer plane 9 dissolves the dye layer in the areas of the carrier film 10 not covered by the mask and transfers the dye onto the receiver element 11 which in the embodiment is a glass plate.

The flash device described thus permits the manufacture of a dye matrix on a surface of the transfer plane 9 of at least 300×600 mm in which edge crispness and high uniformity of the pixels transferred onto the receiver element 11 are achieved.

The invention has been described in detail with particular reference to certain preferred embodiments thereof, but it will be understood that variations and modifications can be effected within the spirit and scope of the invention.

What is claimed is:

1. A flash device for directing high-energy light flash, to a dye transfer plane, such device being usable for dye transfer such as by transferring dye particles from a radiation-absorbing carrier film which is provided with a sublimable dye layer through a mask onto a receiver element, e.g. glass plate or the like, comprising at least one linearly extending plasma discharge tube means defining an aspheric-cylindrical reflector which concentrates radiation from the tube; and a lamellar louver element arranged downstream of the reflector parallelly directing concentrated radiation from the reflector to impinge on the predetermined dye transfer plane in a substantially perpendicular manner.

2. The device according to claim 1, characterized in that the lamellar louver element includes a light absorbing film having microlouvers arranged perpendicular and at right angles to the longitudinal axes of the plasma discharge tube and perpendicular to the dye transfer plane.

3. The device according to claim 2, characterized in that the film is mounted in a frame, and in that the microlouvers in the film are arranged in spaced relation to one another and the reflector so that a uniformity of at least 90% of radiance is provided on the transfer plane.

4. The device according to claim 1, characterized in that the lamellar louver element includes a steel band having absorbing surfaces, and in that the steel band is arranged perpendicular and at right angles to the longitudinal axes of the plasma discharge tube and perpendicular to the dye transfer plane.

5. The device according to claim 4, characterized in that the steel band is held under tension in a frame in a meander-shaped manner, and in that the individual sections of the meandering steel band are arranged parallel and in spaced relation to one another so that a uniformity of radiation on the dye transfer plane of more than 90% is reached.

6. The device according to claim 5, characterized in that in the aspheric-cylindrical reflectors are designed such that lamp radiation is disposed almost perpendicular onto the lamellar louver element.

7. Device according to claim 1, characterized in that the curvature of the reflecting surface of the reflectors follows the curve of intersection $$x = \frac{Y^2}{R\left(1 + \sqrt{1 - (A_k + 1)\frac{Y^2}{R^2}}\right)} + DY^2 + EY^6 + FY^8$$

wherein
R—47,96 mm
$A_k$—1,198
D—0,62×10$_{-7}$
E—2,92×10$_{-11}$
F—1,2×10$_{-15}$.

8. The device according to claim 7 further including means for horizontal and vertical adjustment of the portion of the plasma discharge tube, such means including two micrometric screws.

9. The device according to claim 8, wherein such adjustment means includes stepper motors and wherein the micrometric screws are actuated by such stepper motors.

10. The device according to claim 1, characterized in that the reflector is covered by a highly transmissive and shock-proof quartz glass plate.

* * * * *